July 25, 1961 G. M. SAWYER 2,993,300
SEED GROWTH DISPLAY APPARATUS
Filed Jan. 26, 1959 2 Sheets-Sheet 1
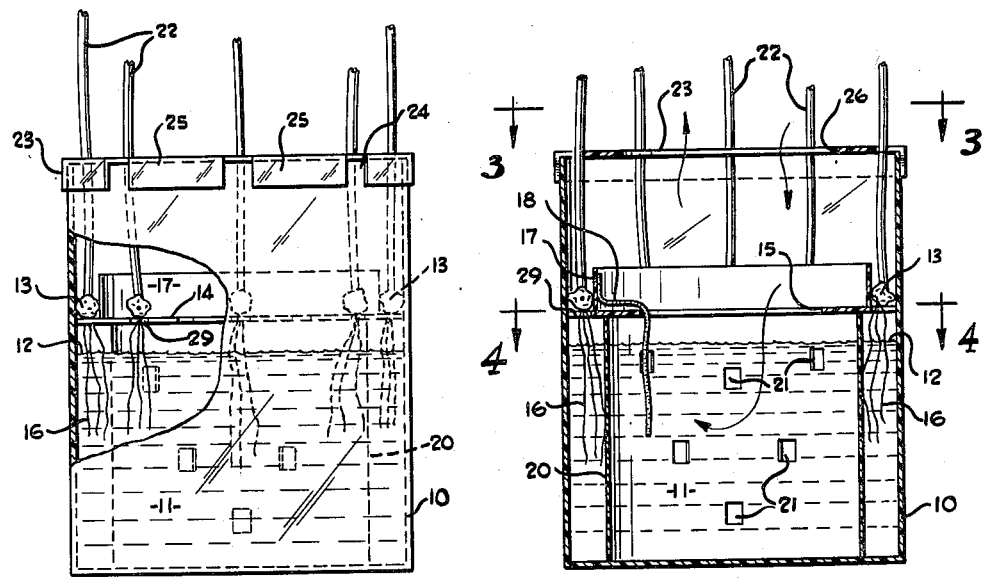
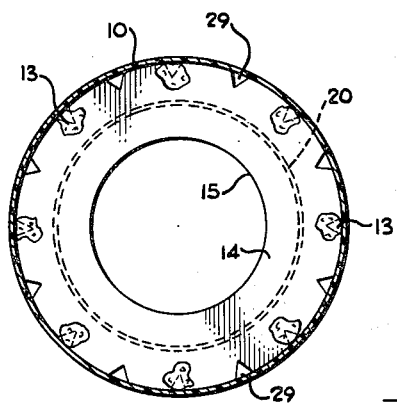
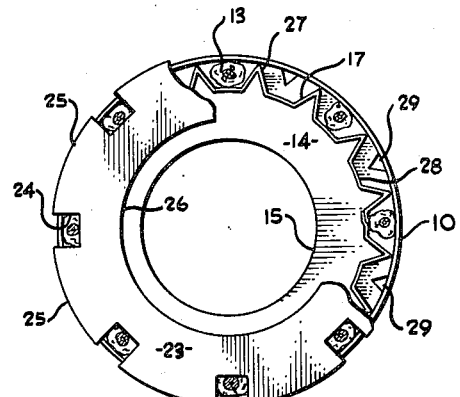
INVENTOR.
GEORGE M. SAWYER
BY
ATTORNEYS

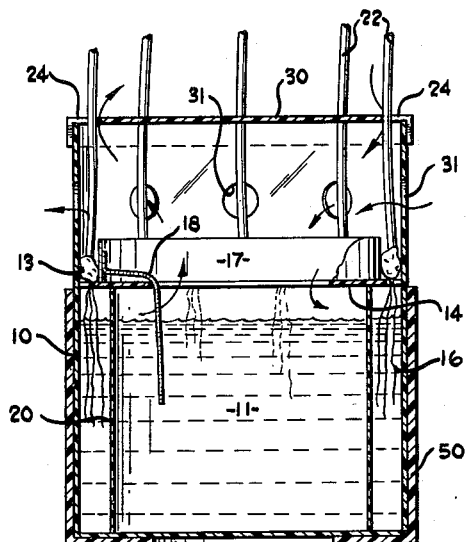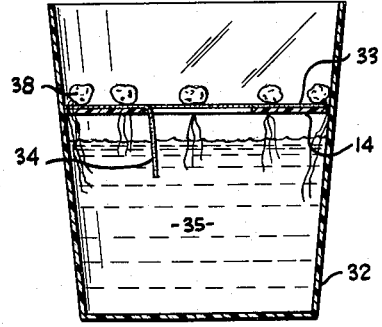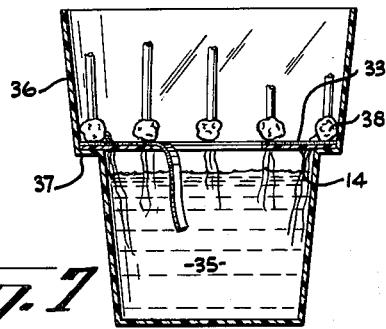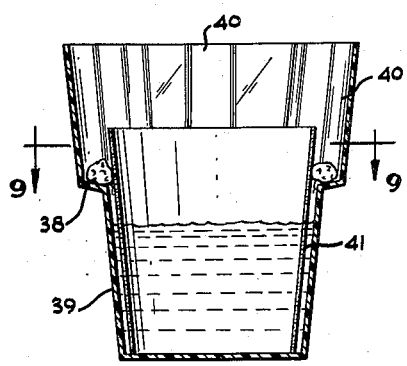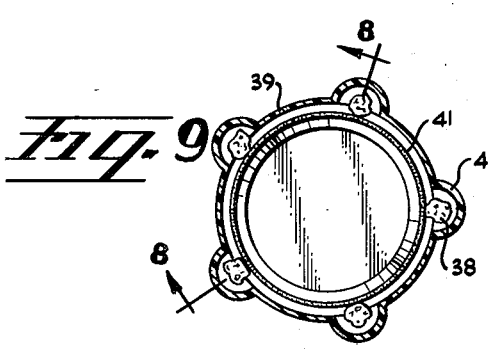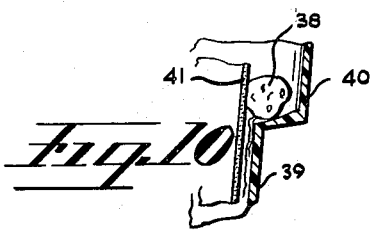
INVENTOR.
GEORGE M. SAWYER
ATTORNEYS

United States Patent Office 2,993,300
Patented July 25, 1961

2,993,300
SEED GROWTH DISPLAY APPARATUS
George M. Sawyer, 4117½ Mildred Ave.,
Los Angeles 66, Calif.
Filed Jan. 26, 1959, Ser. No. 789,169
18 Claims. (Cl. 47—1.2)

This invention relates generally to seed germination apparatus and more particularly has to do with novel seed growth display apparatus constructed so as to cause seed growth to proceed in a highly visible and scientifically constructive manner.

Applicant has conceived the need for seed growth display apparatus which will be attractive and scientifically useful to everyone interested in seed growth. For example, while seed germination is discussed in text books and shown in pictures, there is no known satisfactory apparatus for visibly displaying in complete detail what takes place as seeds begin to grow, particularly in respect to seed root structure and development and stem growth.

Accordingly, the present invention seeks for its major object to provide seed growth apparatus broadly comprising an assembly including a container having a lower interior zone for liquid and a transparent side wall through which that zone is visible, the assembly also including means within the container to support seeds above the interior zone and for keeping the supported seeds wetted with liquid supplied from that zone. The assembly forms vertical openings near the inside of the container wall through which roots may grow downward from the seeds to liquid in the lower zone, to be viewed from the exterior of the container. This recited structure satisfies certain basic requirements which have been found necessary to secure desired seed growth for complete display. For example, it is required that the seeds must be close enough to the transparent wall of the container to allow inspection and they must also have damp material touching them so as to supply the seeds with moisture. On the other hand, the seeds must not be submerged or covered by damp substance as they will then rot. These requirements are partly met by providing a discontinuous medium in contact with the seeds, as distinguished from a constant or continuous medium such as earth surrounding a seed. In particular, the seeds in the present apparatus are adapted to be supported from beneath, but are exposed, so that the seed stems may grow upwardly and be completely visible. Further, the seed roots may grow downwardly through openings provided in the seed supporting means.

Seed support may be provided purely by friction, in which case the seed is forced against the transparent surface of the container to prevent it from dropping, and typically a moisture absorbent material may be provided to form cavities within which the seeds may be dropped, which cavities may diminish in size with depth so that the seed lodges against the container side after dropping into the cavity. Such absorbent material which touches the seed keeps it wet by conducting water from the lower interior zone in the container, and at the same time prevents the seed from being immersed in water. The absorbent material should contain openings below the seeds large enough to allow root penetration but not so large as to permit seed passage downwardly. A high humidity environment is provided by the wet condition of the absorbent material conducting moisture from the liquid or water reservoir to the seed.

The invention also contemplates that the seed stem be supported at a location spaced above the seed support, to prevent the stem from toppling and to cause it to grow vertically upward from the container, for best viewing. Such a stem support may be provided by a cap on the container having circularly spaced openings through which the seed stems may grow, the openings being larger than the stems so that the latter may adjust themselves without being damaged during their growth. Such seed stem constraint means should permit maximum visibility both above and below the constraint location, which requirement is typically met by the cap referred to, all as will be described.

Finally, the invention is directed to various shaped containers wherein seed support means are provided to mount the seeds in a circularly spaced arrangement around the inside of the container. For example, the container may be cylindrical with the seed support means wedged in place or supported therein above the bottom of the container, or the latter may be frusto-conical so that the seed support means cannot drop below the container cross section matching the support means cross dimension. Also, the container may have a series of circularly spaced shoulders for mounting the seeds, as will be described.

The invention also provides that air may freely circulate to the liquid in the lower interior zone for giving sufficient aeration to the roots for best growth. At the same time a container cap may be provided that keeps light rays from penetrating downwardly into the container so as to prevent the growth of algae in the liquid. The roots growing in the liquid may be made highly visible by the introduction of a dark background material spaced inwardly from the container side wall, which material confines the roots proximate the container side wall for best visibility.

These and other objects of the invention, as well as the details of an illustrative embodiment, will be more fully understood from the following detailed description of the drawings, in which:

FIG. 1 is an elevation showing the exterior of the container, and illustrating the visibility of seed growth therein;

FIG. 2 is a vertical section through the container of FIG. 1;

FIG. 3 is a partly broken away plan view taken on line 3—3 of FIG. 2;

FIG. 4 is a section taken on line 4—4 of FIG. 2;

FIG. 5 is a view similar to FIG. 2, showing a modified form of the apparatus;

FIG. 6 shows another modified form of the apparatus;

FIG. 7 shows another modified form of the apparatus;

FIG. 8 is a section taken on line 8—8 of FIG. 9 showing a further modified form of the apparatus;

FIG. 9 is a section taken on line 9—9 of FIG. 8; and

FIG. 10 is a fragmentary enlargement of a portion of FIG. 8.

Referring first to FIGS. 1 through 4, a transparent plastic cylindrical container is shown at 10, with liquid such as water 11 filling the lower interior of the container to the level 12 determining the upper extent of the liquid zone. Above that zone is located seed support means for supporting a plurality of seeds 13 spaced above the liquid level 12.

Such seed support means typically includes an annular support 14 which may be made of plastic and which contains a central opening 15 through which air may circulate upwardly and downwardly for aerating the liquid 11 and seed roots 16 which grow downwardly into the liquid from the seeds. Seed germination and root growth are induced by maintaining the seeds in a wetted condition without keeping them submerged. For example, the seed support means typically includes a resiliently expanding shield or tube 17 standing on the annulus 14 and not only contacting the seeds 13 to wet them but also urging them toward the inner side of the container shell. The shield may have overlapping edges as shown so as to be self expansible prior to being wetted. Liquid is supplied to the tubular shield 17 from a wick 18 extending downwardly into the liquid 11 and also contacting the shield 17. Both the shield and wick may be made of liquid absorbent material, such as cellulose or an ordinary ink blotter.

Reference to FIG. 4 will show the seeds 13 supported on the annulus 14 directly above circularly spaced, small vertical openings 29 through the periphery of the annulus, the purpose of which openings is to allow for seed root growth vertically downwardly adjacent the inner wall of the container and into the liquid. Such seed root growth is made more visible by the provision of a tubular body 20 having a darkened outer surface forming a background against which the roots 16 are highly visible from the exterior. The body 20 extends axially upwardly within the lower interior zone of the container, and typically supports the annulus 14 well above the top level 12 of the liquid. The latter and air may circulate freely through openings 21 in the tubular body 20 to provide for maximum aeration of the roots 16. The liquid supplied to the container may comprise water, or water to which has been added chemical or other nutrients, as are well known to horticulturists.

As the seeds grow, the plant stems 22 push upwardly above the top of the container, where means is provided for preventing the stems from toppling while at the same time keeping them most highly visible. Such a means is shown in FIGS. 1, 2 and 3 in the form of a container cap 23 typically made of flexible plastic, and typically having openings 24 extending radially inwardly from the periphery of the cap above the seed locations. As the stems push upwardly above the level of the cap the latter may be placed on the container and the sections 25 of the cap between the openings may be adjusted as by lifting them individually, so as to cause the stems 22 to be desirably confined within the openings 24 without harming the stems. The openings themselves are somewhat larger than the stems to facilitate such adjustment, and the cap 23 is shown as forming a large central opening 26 through which air may circulate downwardly to the liquid, as indicated by the arrows in FIG. 2.

FIG. 3 shows lateral projections or ribbed portions 27 of the tubular shield 17 acting with the container to form circularly spaced pockets or cavities 28 for confining the seeds 13 against lateral displacement during carriage of the container. These cavities are open at their tops to allow for stem growth upwardly, and they also communicate with small bottom openings 29 formed by the annular support 14, and through which the roots may grow downwardly.

Referring now to FIG. 5, the structure therein shown is for the most part the same as illustrated in FIG. 2 and therefore the same numbers are applied, where applicable. On the other hand, the cap 30 illustrated does not contain a central opening and furthermore is darkened or opaque to prevent light transmission downwardly to the liquid in the container, all for the purpose of preventing or inhibiting algae formation in the container liquid. In addition, the transparent container 10 is received in and fits a darkened or light opaque receptacle 50, which extends above the surface level of liquid in the container so as to inhibit algae formation therein. At the same time, the darkened receptacle does not cover the plant stem structure, which remains visible. The bottom of the receptacle contains a hole 51 accommodating push out removal of the container 10 from the receptacle 50, when it is desired to view the plant root structure. Air circulation is maintained typically by the provision of side openings 31 in the container above the level of the annular support 14, and also through the openings 24 in the cap through which the stems 22 extend, all as indicated by the arrows.

Referring now to FIGS. 6 through 9, in which various modifications of the invention are illustrated, the FIG. 6 container 32 is frusto-conical in outline instead of cylindrical. Accordingly, the seed support annulus 14 seats against the inside wall of the container as shown. Also, the seeds rest on a sheet 33 of absorbent material which in turn is supported on the annulus 14, an elongated wick 34 extending downwardly from the sheet 33 into the liquid 35 for keeping the sheet and seeds wetted.

In FIG. 7 the container 36 has an annular shoulder 37 seating the support annulus 14 as illustrated. Otherwise, the structure remains the same as shown in FIG. 6 with the seeds 38 mounted on the sheet of absorbent material 33. The latter is removable from the container with the seeds, roots and stems during any stage of root and stem growth.

FIGS. 8 through 10 show a container 39 having a plurality of circularly spaced upwardly facing shoulders 40 for seating the seeds 38. The latter are contacted by the liquid absorbent material 41 which extends upwardly in cylindrical sheet form radially inwardly of the seeds 38.

As previously described in connection with FIG. 1, the seed support annulus 14 is typically composed of absorbent material. Such material may comprise excelsior, vermiculite, woven material with openings between the fibers, or any granular or fibrous material, so long as it possesses spaces or openings such as holes, recesses, notches, slots, or slits through which roots may pass into the liquid below.

I claim:
1. Seed growth display apparatus, comprising an assembly including a container the upper interior of which is open and having a lower interior zone for liquid and a transparent side wall through which said zone is visible, and means within the container to support a seed spaced above said zone and for keeping the supported seed wetted with liquid supplied from said zone, said means including a shelf having sufficient width to support large or small seeds at an elevation substantially lower than the top of the container and lower than the upper interior of the container so that the seed stems may be supported by structure at the top of the assembly and substantially higher than the level of said shelf, said assembly forming a vertical opening near the inside of the container through which roots may grow downward from the seed into liquid in said lower zone to be viewed from the exterior of the container, said means for keeping the seed wetted including liquid absorbent material adapted to contact the seed and liquid in the lower zone.

2. Seed growth display apparatus, comprising an assembly including a container the upper interior of which is open and having a lower interior zone for liquid and a transparent side wall through which said zone is visible, means within the container to support seeds spaced above said zone and for keeping the supported seeds wetted with liquid supplied from said zone, said means including a shelf having sufficient width to support large or small seeds at an elevation substantially lower than the top of the container and lower than the upper interior of the container so that the seed stems may be supported by structure at the top of the assembly and substantially higher than the level of said shelf, said assembly forming vertical openings near the inside of the container through which roots may grow downward from the seeds into liquid in said lower zone to be viewed from the exterior of the container, and means at an upper location to support stems growing upward from said seeds and out of the container, whereby the bulk of each stem below said upper location is visible from the exterior of the container, said means for keeping the seeds wetted including liquid absorbent material adapted to contact the seeds and liquid in the lower zone.

3. Seed growth display apparatus, comprising an assembly including a container the upper interior of which is open and having a lower interior zone for liquid and a transparent side wall through which said zone is visible, and means within the container to support seeds spaced above said zone and for keeping the supported seeds wetted with liquid supplied from said zone, said means including a shelf having sufficient width to support large or small seeds at an elevation substantially lower than the top of the container and lower than the upper interior of the container so that the seed stems may be supported by structure at the top of the assembly and substantially higher than the level of said shelf, said seed support means confining the seeds close to the inner side of the container, said assembly forming vertical openings near the inside of the container through which roots may grow downward from the seeds into liquid in said lower zone to be viewed from the exterior of the container, said means for keeping the seeds wetted including liquid absorbent material adapted to contact the seeds and liquid in the lower zone.

4. Seed growth display apparatus, comprising an assembly including a container the upper interior of which is open and having a lower interior zone for liquid and a transparent side wall through which said zone is visible, and means within the container to support seeds spaced above said zone and for keeping the supported seeds wetted with liquid supplied from said zone, said means including a shelf having sufficient width to support large or small seeds at an elevation substantially lower than the top of the container and lower than the upper interior of the container so that the seed stems may be supported by structure at the top of the assembly and substantially higher than the level of said shelf, said assembly forming vertical openings near the inside of the container through which roots may grow downward from the seds into liquid in said lower zone to be viewed from the exterior of the container, said lower interior zone being in open communication with the exterior of the container so that air may freely circulate thereto, said means for keeping the seeds wetted including liquid absorbent material adapted to contact the seeds and liquid in the lower zone.

5. Seed growth display apparatus, comprising an assembly including a container the upper interior of which is open and having a lower interior zone for liquid and a transparent side wall through which said zone is visible, and means within the container to support seeds spaced above said zone and for keeping the supported seeds wetted with liquid supplied from said zone, said means including a shelf having sufficient width to supoprt large or small seeds at an elevation substantially lower than the top of the container and lower than the upper interior of the container so that the seed stems may be supported by structure at the top of the assembly and substantially higher than the level of said shelf, said means including a liquid absorbent material adapted to contact the seeds and liquid in said lower zone, said assembly forming vertical openings near the inside of the container through which roots may grow downward from the seeds into liquid in said lower zone to be viewed from the exterior of the container.

6. Seed growth display apparatus, comprising an assembly including a transparent container the upper interior of which is open and having a lower interior zone which is visible through the container side wall, means within the container to support seeds spaced above said zone and close to the inner side of the container and for keeping the seeds wetted with liquid supplied from said zone, said means including a shelf having sufficient width to support large or small seeds at an elevation substantially lower than the top of the container and lower than the upper interior of the container so that the seed stems may be supported by structure at the top of the assembly and substantially higher than the level of said shelf, said means including a liquid absorbent material extending upwardly from said lower interior zone for supplying said liquid by capillary action, said assembly forming vertical openings near the inside of the container through which roots may grow downward from the seeds into liquid in said lower zone to be viewed from the exterior of the container.

7. The invention as defined in claim 6 including a container cap to support stems growing upward from the seeds through cap openings and to the exterior above the container, whereby the bulk of each stem below the cap is visible from the exterior of the container.

8. The invention as defined in claim 7 comprising a plastic container and cap, said cap opening being formed inwardly of the cap periphery and said cap being flexible so that sections of the cap between said openings may be lifted off the container to permit adjustment of said stems.

9. The invention as defined in claim 6 in which said seed support means includes an annular body forming a central opening through which air may freely circulate vertically to said lower zone.

10. The invention as defined in claim 6 in which said seed support means forms a plurality of circularly spaced recesses opening radially outwardly toward the container inner side for confining seeds placed therein.

11. The invention as defined in claim 6 including a tube extending axially upwardly within said lower zone in inwardly spaced relation to the container inner side for confining said roots proximate the container inner side, said tube being opaque to provide a background against which the seed roots are easily visible from the exterior.

12. The invention as defined in claim 6 in which said support means includes an absorbent body for receiving liquid from said material and for urging the seeds outwardly toward the inner side of the container.

13. The invention as defined in claim 6 in which said container has a cylindrical side wall.

14. The invention as defined in claim 6 in which the container side wall is frusto-conical and seats said support means.

15. The invention as defined in claim 6 in which said container side wall has an annular shoulder seating said support means.

16. The invention as defined in claim 6 in which said container has a plurality of circularly spaced and upwardly facing shoulders for seating said seeds.

17. The invention as defined in claim 6 including an opaque receptacle within which said container is removably received.

18. The invention as defined in claim 7 in which said cap is opaque.

References Cited in the file of this patent
UNITED STATES PATENTS

| | | |
|---|---|---|
| 2,026,322 | Raines | Dec. 31, 1935 |
| 2,879,627 | Hollander | Mar. 31, 1959 |
| 2,884,740 | Hollander | May 5, 1959 |